United States Patent [19]

Rysti

[11] 4,077,524

[45] Mar. 7, 1978

[54] APPARATUS FOR SEQUENTIALLY FORWARDING BODIES TO A CONVEYER

[76] Inventor: Alpo Rysti, Frisansintie 22, 02240 Espoo 24, Finland

[21] Appl. No.: 688,030

[22] Filed: May 19, 1976

[51] Int. Cl.² .............................................. B65G 59/00
[52] U.S. Cl. ................................. 214/8.5 A; 198/491; 214/1 PB; 214/8.5 G
[58] Field of Search ............. 193/35 G; 198/491, 495; 214/1 R, 1 P, 1 PB, 1 BD, 8.5 R, 8.5 A, 8.5 K, 152, 8.5 G

[56] References Cited

U.S. PATENT DOCUMENTS

| 2,046,549 | 7/1936 | Crowell et al. ............... 214/1 PB X |
| 3,080,042 | 3/1963 | Sherman ............................. 198/491 |

FOREIGN PATENT DOCUMENTS

| 653,587 | 12/1962 | Canada .................................. 198/491 |
| 2,104,688 | 4/1972 | France .............................. 214/8.5 A |

Primary Examiner—Frank E. Werner
Attorney, Agent, or Firm—Steinberg & Blake

[57] ABSTRACT

Apparatus for sequentially feeding elongated bodies, such as beams, timber, planks, or the like, one after the other from an uninterrupted layer of the bodies, wherein they are arranged in a row extending transversely of the row and directly engaging each other, to a conveyer. The layer of bodies are supported in such a way that the row of bodies is urged forwardly with an end body situated at the leading end of the row and engaged by the next body which in turn is engaged by the third body and so on. A stop structure engages the end body for temporarily holding the row against forward movement, and a moving structure is operatively connected with the stop structure for temporarily displacing the stop structure away from the end body at the leading end of the row to release the end body for movement away from the next body so as to create at least a small clearance between the end body and the next body. While this clearance exists a lifting structure engages the end body and lifts it away from the layer and deposits it on the conveyer. The moving structure then returns the stop structure back to its initial position for engaging the next body when it occupies the position previously occupied by the end body. These operations are repeated with respect to the next body, and so on.

10 Claims, 2 Drawing Figures

APPARATUS FOR SEQUENTIALLY FORWARDING BODIES TO A CONVEYER

BACKGROUND OF THE INVENTION

The present invention relates to devices for sequentially feeding elongated bodies, such as beams, timber, planks, or the like, to a conveyer.

In the handling of beams, such as timber beams cut by suitable saws from logs so as to have a predetermined length, width, and thickness, it is often necessary to feed the beams one-by-one at a given distance from each other into a machine such as a sorting machine. When attempting to increase the capacity of such machines, a limiting factor is encountered in connection with a limitation on the speed with which the beams can be fed. The reason for this is that at high feeding speeds on the order of over one hundred timber beams per minute, the beams do not remain stable but instead are inclined to jump or tilt. Thus, the beams are initially arranged in an uninterrupted layer wherein the beams are situated in a row, extending transversely of the row, and directly engaging each other. During high feeding speeds as set forth above the beams in such a layer tend to tilt with respect to the layer or jump out of the layer.

Attempts have already been made to avoid this drawback. For example, reference may be made to Finnish Patent No. 43,564 and Swedish Patent No. 325,299. According to these patents a movable barrier is lowered toward the layer to prevent occurrences as set forth above, but the fact that the timber beams move primarily horizontally with such devices results in a serious limiting of the speed with which the beams can be fed to a conveyer.

While Finnish Pat. No. 48,569 also shows a structure tending to solve this problem, this structure is not suited for planed timber beams because the structure of this patent has grabbers provided with spikes which mar the surfaces of the beams.

When feeding small or planed, previously sawed timber beams at high speed, particularly under icy conditions, the most effective feeding has proved to be one where the timber is fed by being lifted from the timber layer because in such case suitable picker lines can be utilized while being situated close to each other and the quantity of timber beams fed sequentially in a given unit of time would be relatively large although the picking speed is relatively slow and the feeding operations are relatively quiet.

However, with procedures as set forth above, a particular defect has been encountered with respect to the friction between a beam which is being transported from the layer to a conveyer and the next beam, this friction being so great that the beam next to the one which is being fed turns or tilts or moves in some other way from its proper position, thus resulting in a breakdown of the feeding operations. Often such breakdowns result in interrupting the whole production line for a considerable interval.

While efforts have been made to avoid this problem by mounting barriers over the beams next to their upper surface, this expedient is disadvantageous in that it requires additional structure which also causes undesirable breakdowns in the operations particularly when timber beams of an improper size are fed.

SUMMARY OF THE INVENTION

It is accordingly a primary object of the present invention to provide an apparatus which will avoid the above drawbacks.

Thus, in particular, it is an object of the present invention to provide an apparatus according to which it is possible to sequentially transport beams from a layer thereof to a conveyer in such a way that it is possible to achieve high feeding speeds on the order of one hundred beams per minute or more, without risking any undesirable change in the position of the successive beams which are sequentially fed and without requiring any special barrier structure, guide structure, or the like, to maintain the beams stably in the required position.

Also, it is an object of the present invention to provide an apparatus according to which it becomes possible to transfer the beams sequentially from a layer of the beams to a conveyer without inverting the beams.

It is also an object of the present invention to provide a relatively simple, quietly operating apparatus which is highly reliable so as to achieve the desired results without breakdowns in the operation.

According to the invention a stop means is moved away from the end beam at the leading end of the layer of beams in such a way that a clearance will automatically be created between this end beam and the next beam, and the feeding operations are carried out in synchronism with the movement of the stop means in such a way that lifting of the end beam away from the layer takes place while there is at least a slight clearance between the end beam at the leading end of the layer and the next beam. The stop means then returns back to its initial position to engage the next beam when it occupies the position of the end beam previously removed from the layer and deposited on the conveyer.

The stop means takes the form, for example, of a swingable lever or levers operated by a moving means which may include a hydraulically operated cylinder-and-piston assembly, with the lever and moving means connected thereto being carried by a carriage which can be adjusted by way of a suitable adjusting means in accordance with the width of the beams.

Thus, in accordance with the invention for feeding to a conveyer elongated bodies, such as beams, timber, planks, or the like, one after the other from an uninterrupted layer of these bodies wherein the bodies are arranged in a row extending transversely of the row and directly engaging each other, the layer of bodies is placed in a condition according to which the row of bodies is urged forwardly with an end body situated at the leading end of the row being engaged by the next body which in turn is engaged by the third body, and so on. This end body is temporarily held by a stop structure which engages the end body at the leading end of the row so as to temporarily prevent forward movement of the layer of bodies. This stop structure is temporarily displaced away from the end body at the leading end of the row to release the end body for movement away from the next body so as to create at least a small clearance between the end body and the next body. While this clearance exists the end body is lifted away from the layer of bodies and deposited on a conveyer. The stop structure is returned back to its initial position so as to engage the next body when it occupies the position previously occupied by the end body, and the above operations are repeated with respect to the next body, and so on.

With the structure of the invention a stop means when in an initial position temporarily engages the end body at the leading end of the layer which is supported by a support means in a condition according to which the layer of bodies is urged to move forwardly toward the stop means. A moving means is operatively connected with the stop means to displace the latter away from its initial position to release the end body for movement away from the next body so as to create the above clearance, and while the latter clearance exists a lifting means lifts this end body away from the layer and deposits the lifted body onto a conveyer means. The moving means returns the stop means back to its initial position to engage the next body when it occupies the position previously occupied by the above end body.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
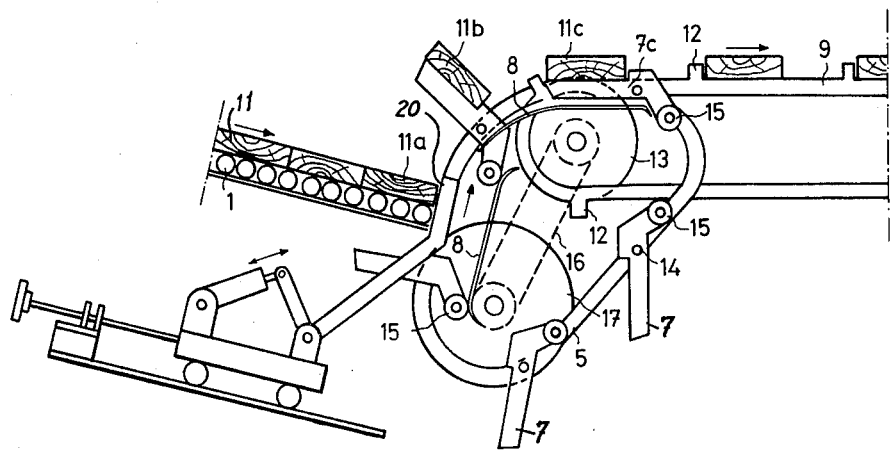
FIG. 1 is a schematic side elevation of an apparatus of the invention the structure being shown in FIG. 1 in the condition where the stop means engages an end body at the leading end of a layer of the elongated bodies.

Referring to FIG. 1, there are illustrated therein a plurality of elongated bodies 11 in the form of elongated timber beams arranged in a layer in which the beams directly engage each other while being arranged in a row with the beams extending transversely across the row. A support means 1 supports the layer of beams 11 in a condition according to which the layer is urged forwardly toward the right, as shown by the arrow in FIG. 1, so that the end beam 11a is situated at the leading end of the layer of beams. In the illustrated example the support means 1 includes a series of freely rotatable rollers located closely next to each other as illustrated with the series of rollers being arranged in an inclined plane according to which the layer is urged gravitationally downwardly toward the right, as viewed in FIG. 1. In the position of FIG. 1 a stop means 20 engages the end beam 11a so as to prevent downward movement of the layer of beams, this stop means 20 being shown in FIG. 1 in its initial position engaging the end beam 11a.

A lifting means is provided for lifting the end beam 11a away from the layer of beams 11, and in the illustrated example this lifting means includes at least a pair of coextensive endless chains 5 spaced from each other at a suitable distance in accordance with the length of the beams and guided by sprocket wheels or the like, such as the illustrated sprocket wheel 17, for movement along an endless path as shown for the endless chain 5 which is illustrated. Instead of chains it is of course also possible to use flexible belts, for example. Moreover, in addition to wheels such as sprocket wheels 17 it is also possible to use other guides such as bars or plates along which the chains slide.

The lifting means includes in addition to the endless chains 5 lifting levers 7 which are distributed in the manner illustrated along each chain and each of which is pivoted intermediate its ends by way of a suitable pivot pin 14 carried by the chain 5, the arrangement being such that each lever 7 is free to swing on the pivot 14. A drive chain 16 which is schematically illustrated in FIG. 1 is driven from any suitable source such as a suitable motor and serves to drive the sprockets 17 which thus move the chains 5 as well as sprockets or rollers 13 which serve to operate a conveyer means 9 in synchronism with the lifting means formed by the chains 5 and the levers 7 carried thereby. The conveyer means 9 serves to feed the beams sequentially at a given distance from each other to a machine such as a sorting machine.

The several lifting levers 7 have elongated portions on one side of the pivots 14 for directly engaging the beams 11 while other portions of the lever 7 on the other side of the pivots 14 carry cam rollers 15. The pair of chains 5 which are spaced from each other in accordance with the length of the beams, as set forth above, carry equal numbers of lifting levers 7 which are arranged in pairs so that a pair of the levers 7 respectively carried by the chains 5 will be synchronously operated in the manner shown for the levers 7 in FIG. 1. The conveyer means 9 is driven by way of the wheel 13 or other suitable drive structure and will deliver the beams 11 one by one at a given distance from each other. For this purpose the conveyer 9 has at its chains or belts projections 12 which engage behind the successive beams as illustrated. No particular barriers to lifting movement of the beams are required for reasons which will appear below.

Of course, the conveyer belts or chains 5 shown in FIG. 1 can be replaced by suitable drums, flanges, or other corresponding structures synchronously driven with the conveyer means 9 and carrying the pivots 14 on which the lifting levers 7 are mounted so as to carry out the operations set forth below.

Figure 2:
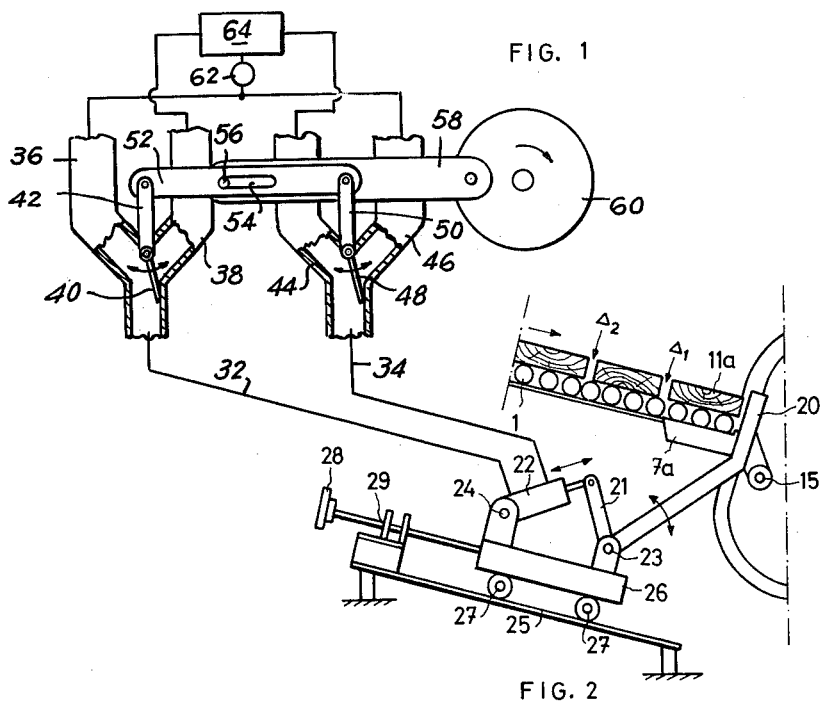
FIG. 2 is a schematic side elevation showing the apparatus of FIG. 1 in a condition where the layer of bodies has been released for movement with FIG. 2 also showing additional details of a possible embodiment of a moving means which moves the stop means.

It is advantageous to design the apparatus of the invention in such a way that the pair of lifting levers 7a shown in FIG. 2 which are just about to engage the end beam 11a have at their portions which engage the beam at the underside thereof an inclination according to which these portions of the levers 7a are parallel to the lower surface of the end beam 11a. In this way a reliable lifting of the end beam is assured. The cam rollers 15 are guided by suitable cams 8 indicated in FIG. 1 so that the several lifting levers as they approach the end beam will have the inclination indicated for the levers 7a in FIG. 2, and these cams also serve to control the inclination of the lifting levers so that the beams will be lifted away from the layer and deposited on the conveyer 9 in the manner indicated in FIG. 1 while the attitude of the beams remains substantially unchanged so that inverting of the beams is not required. Thus it will be seen that prior to the beam 11a shown in FIG. 1 a beam 11b is on its way to the conveyer 9 and is only slightly inclined with respect to the inclination of the layer 11, and the beam 11c has just been deposited on the upper run of the conveyer 9 while being in a horizontal attitude corresponding to that of the upper run of the conveyer 9 as a result of the guiding of the lifting levers 7c shown in FIG. 1 by the cam structure 8. Thus when each pair of lifting levers reaches the position shown for the levers 7c in FIG. 1, a beam in the position of the beam 11c of FIG. 1 will be deposited in a horizontal attitude on the upper horizontal run of the conveyer 9. Thus there is no necessity for inverting the beams during feeding thereof and in this way several beams 11 are transported in the best possible position by the sorting conveyor 9.

Thus, the support means 1 supports the layer of beams 11 with an extremely low friction in such a way that gravitationally these beams are free to move downwardly toward the right, as viewed in FIG. 1, and the stop means 20 prevents such movement when the stop means 20 is in its initial position shown in FIG. 1. In accordance with the invention the stop means 20 is operated by a moving means in synchronism with the operation of the lifting means 5, 7. The stop means 20 includes at least one elongated lever having the configuration illustrated in the drawings and having a lower arm 21 directed upwardly toward the left, as viewed in the drawings, from a pivot means 23 which supports the lever 20 for swinging movement back and forth about the pivot means 23. The illustrated moving means includes a cylinder-and-piston assembly 22, the piston of which is pivotally connected with the upper end of the arm 21. The pivot means 23 is carried by a carriage means 26 which also carries a pivot means 24 which pivotally supports the cylinder of the moving means 22. The carriage 26 can be relatively wide and a pair of levers 20 can be arranged spaced from each other having their arms 21 interconnected by a horizontal rod which in turn is connected to the piston rod extending out of the cylinder 22.

An adjusting means is operatively connected with the carriage means 26 so as to adjust the position thereof in accordance with the width of the beams 11. Thus, it will be seen that the carriage 26 is supported on rollers 27 which in turn are supported on suitable rails or the like for rolling movement in a plane parallel to the plane of the layer 11. The structure which supports the rollers 27 on which the carriage 26 is located includes the guide structure 25 which carries the adjusting means. This adjusting means includes, for example, a screw means 28, 29. Thus, an elongated screw which can be turned by the handwheel 28 is rotatably connected with one end of the carriage 26 and extends through a threaded nut 29 carried by the frame 25 so that by turning the handle 28 it is possible to control the position of the carriage 26 in the plane parallel to the layer beams 11 and thus control the location of the stop means 20 in accordance with the width of the beams 11.

In FIG. 1 the stop means 20 is shown in its initial position and all of the beams 11 directly engage each other. In FIG. 2, however, the stop means 20 has been displaced forwardly away from its initial position shown in FIG. 1, this forward movement of the stop means 20 away from the end beam 11a taking place just before the end beam 11a is engaged by the lifting levers 7a.

The present invention utilizes the property of beams such as beams 11 arranged in a layer as shown in FIG. 1 to move when released by the stop means 20 in such a way that the leading end beam 11a will first move away from the next beam while the next beam will then move away from the third beam, and so on, thus creating in this way a clearance $\Delta_1$ between the end beam 11a and the next beam as well as a clearance $\Delta_2$ between this next beam and the third beam, and so on. The beams behave automatically, under the influence of gravity, in such a way that when the stop means 20 is moved forwardly away from the leading end beam clearances are created between the successive beams according to a relationship $\Delta_1 > \Delta_2 > \Delta_3$ . . . While substantial clearances are indicated in FIG. 2, it is also possible to carry out the invention in such a way that the clearance between the end beam 11a and the next beam is very slight, being only sufficient to decrease the frictional resistance to lifting movement of the end beam 11a by engagement with the next beam, so that a very high speed operation can be achieved.

Thus, in accordance with the invention just before levers which reach the position of levers 7a in FIG. 2 are about to engage the end beam, the stop means is displaced by the moving means 22 away from the end beam to release the layer for movement so as to create at least a slight clearance between the end beam and the next beam and while this clearance exists the end beam is lifted by a pair of lifting levers. Once this end beam has thus been lifted without any frictional retarding by the next beam due to the creation of at least a slight clearance as set forth above, the stop means 20 is returned by the moving means 22 back to its initial position to engage the next beam when it occupies the position occupied by the beam 11a in FIG. 1. Then the above operations are repeated for these successive beams.

Thus, the present invention is based on the observation that when the layer of beams is released the entire layer does not move as a single unit. Instead the leading end beam will first move with respect to the next beam. While in the illustrated example the low-friction support means including a series of freely rotatable rollers is provided, it is possible to provide other supporting structures such as a plain chain or corresponding structure which urges the layer forwardly in such a way that when released from the stop means the leading end beam is free to move away from the next beam. Thus, the invention is not necessarily limited to supporting the layer of beams in such a way that they will tend to move under the influence of gravity.

By way of example, FIG. 2 shows a pair of flexible conduits 32 and 34 respectively communicating with the opposite ends of the cylinder 22 and connected to branch conduits with valves situated at the intersection of the branches. Thus conduit 32 communicates with branch conduits 36 and 38 at the junction of which is situated a valve 40 fixed with a lever 42 which turns to move the valve between positions alternately closing and opening the branch conduits 36 and 38. In the same way, the conduit 34 communicates with branch conduits 44 and 46 having at their junction a valve 48 fixed to a lever 50. The levers 42 and 50 are pivotally connected with a bar 52 which acts with the levers 42 and 50 in the manner of a parallelogram linkage, this bar 52 being formed with a slot 54 receiving a pin 56 fixed to one end of a connecting rod 58 which is pivotally connected eccentrically to a driven disc 60 which is rotated about its center in the manner illustrated so as to reciprocate the lever 58 and bring about swinging of the valves 48 in synchronism between positions respectively opening and closing the branch conduits. A pump 62 supplies fluid under pressure to the branch conduits 36 and 46 this fluid being derived from a tank 64 which communicates with the branch conduits 38 and 44. Thus in the position shown in FIG. 2, the pumped fluid can flow only through the branch conduit 36 into the lower end of the cylinder 22 so as to drive the stop means 20 in a clockwise direction, thus achieving the release position shown in FIG. 2. During the continued turning of the disc 60, the valves 40 and 48 will be swung to their other positions closing the branch conduits 36 and 44. When the branch conduit 36 is open, the branch conduit 44 is also open so that the fluid discharge from the right end of the cylinder 22 can be returned to the tank. When the conduit 46 is open fluid under pressure will be delivered to the top end of the cylinder 22 so as to return the stop means 20 to its initial position while at the same time fluid can discharge from the bottom end of the cylinder 22 through the branch conduit 38 back to the tank 64.

It is thus clear that in accordance with the apparatus of the invention there is a considerable advantage in providing for the creation of the slight clearance between the leading end beam and the next beam since in this way this beam which is next to the end beam 11a cannot tilt or jump or assume in any way an unstable condition inasmuch as there is no transmission of movement from the leading end beam 11a to the next beam. The moving means 22 is operated in such a way that the stop means returns to its initial position before the next beam reaches the position occupied by the beam 11a in FIG. 1.

Of course, the invention is not particularly restricted by the details set forth above by way of example only. Various features of the invention can have a number of different constructions within the limits of the claims which follow.

What is claimed is:

1. In an apparatus which includes a conveyer means to which elongated bodies, such as beams, timber, planks, or the like, are to be fed one after the other from an uninterrupted layer of said bodies wherein the bodies are arranged in a row extending transversely of the row and directly engaging each other, support means supporting the layer of bodies in a condition according to which the row of bodies is urged forwardly with an end body situated at the leading end of the row being engaged by the next body which in turn is engaged by the third body, and so on, stop means situated adjacent said support means for temporarily engaging the end body at the leading end of the row, when said stop means is in an initial position thereof, to temporarily prevent forward movement of the layer of bodies, moving means operatively connected with said stop means for displacing the latter from said initial position thereof away from the end body at the leading end of the row to release the end body for movement away from the next body so as to create at least a small clearance between said end body and the next body, and for returning said stop means back to said initial position thereof, and lifting means situated adjacent said support means, said stop means, and said conveyer means for lifting said end body away from said layer of bodies while but not before said clearance exists and depositing the lifted body on said conveyer means, said stop means when returned by said moving means to said initial position engaging the next body when it occupies the position previously occupied by said end body, said moving means moving said stop means repeatedly away from and back to said initial position thereof while said lifting means operates in synchronism with said moving means to repeat the above operations on the bodies of said layer which successively reach the position at the leading end of the row occupied initially by said end body.

2. The combination of claim 1 and wherein said lifting means lifts the bodies which successively reach the leading end of said row from said layer and deposits said bodies one after the other on said conveyer means while maintaining the attitude of said bodies substantially unchanged, so that said bodies are not inverted while being transferred from said layer to said conveyer means by said lifting means.

3. The combination of claim 1 and wherein said moving means is operatively connected with said stop means for moving the latter away from said initial position thereof in the same general direction that said layer moves when released from said stop means, and said moving means returning said stop means to said initial position while moving said stop means in the reverse direction.

4. The combination of claim 1 and wherein said stop means includes at least one lever, pivot means supporting said lever for turning movement, and said moving means being operatively connected with said lever for turning the latter away from and back toward said initial position thereof.

5. The combination of claim 4 and wherein a carriage means carries said pivot means and at least part of said moving means which is operatively connected with said lever, and adjusting means operatively connected with said carriage means for adjusting the position thereof in a plane which is substantially parallel to the layer of bodies, so that the position of said stop means can be adjusted in accordance with the width of the bodies.

6. The combination of claim 1 and wherein a carriage means carries said stop means and at least part of said moving means which is operatively connected with said stop means, and adjusting means operatively connected with said carriage means for adjusting the latter in a plane parallel to the layer of bodies so that the position of said stop means can be adjusted in accordance with the width of said bodies.

7. The combination of claim 6 and wherein a guide means guides said carriage means for movement in a plane parallel to said layer, said adjusting means including a screw means carried by said guide means and operatively connected with said carriage means for adjusting the position thereof in said plane.

8. The combination of claim 1 and wherein said support means supports said layer in a plane which is inclined at least slightly downwardly toward the leading end of said row and with a friction sufficiently low to enable the layer to move downwardly in the plane in which it is supported by gravity when said stop means is moved by said moving means away from said initial position engaging the end body at the leading end of the row, the latter end body moving gravitationally away from the next body to create said clearance.

9. The combination of claim 8 and wherein said support means includes a series of freely rotatable rollers on which the bodies in said layer rest.

10. The combination of claim 1 and wherein said lifting means is separate from and unconnected to said stop means.

* * * * *